United States Patent [19]
Erdmann et al.

[11] Patent Number: 4,486,656
[45] Date of Patent: Dec. 4, 1984

[54] PULSED LIGHT BARRIER APPARATUS FOR DIRECT CONNECTION TO AN A.C. SUPPLY

[75] Inventors: Jürgen Erdmann; Fritz Kuhn, both of Waldkirch, Fed. Rep. of Germany

[73] Assignee: Erwin Sick GmbH Optik-Elektronik, Fed. Rep. of Germany

[21] Appl. No.: 360,018

[22] Filed: Mar. 19, 1982

[30] Foreign Application Priority Data

Apr. 3, 1981 [DE] Fed. Rep. of Germany ....... 3113547

[51] Int. Cl.³ .............................................. H01J 40/14
[52] U.S. Cl. ................................ 250/214 R; 250/221; 307/252 B; 307/311
[58] Field of Search ............ 250/214 R, 214 RC, 221, 250/206; 340/555, 556, 557, 512; 307/252 B, 311

[56] References Cited

U.S. PATENT DOCUMENTS

| | | | |
|---|---|---|---|
| 3,723,737 | 3/1973 | Zeldman et al. | 250/221 X |
| 3,889,118 | 6/1975 | Walker | 250/221 X |
| 4,119,905 | 10/1978 | Head | 307/252 B X |

FOREIGN PATENT DOCUMENTS

2710631 9/1978 Fed. Rep. of Germany ...... 250/221

*Primary Examiner*—Edward P. Westin
*Attorney, Agent, or Firm*—Townsend and Townsend

[57] ABSTRACT

Pulsed light barrier apparatus is driven directly from an a.c. supply voltage connected to the terminals L and M with the terminal M being earthed. A storage capacitor 14 is charged during the positive half wave of the a.c. supply voltage and is discharged at a time determined by a programmable unijunction transistor 13 through a photodiode 11 to emit a flash of light which passes across a region monitored by the light barrier to a photoreceiver 26. A Zener diode limits the voltage across the storage capacitor 14 to a value less than the peak a.c. supply voltage. As soon as the voltage across the storage capacitor has reached the Zener breakdown voltage the excess energy from the a.c. supply voltage is directed through a rectifier diode 18 to a smoothing capacitor 19 where it forms a positive operating voltage for the light receiver arrangement. During the negative half wave of the a.c. supply voltage the electrical energy is supplied via a further rectifier diode 20 connected in the opposite direction to the rectifier diode 18 to a further smoothing capacitor 21 where it forms the negative operating voltage for the light receiver arrangement. The circuitry described prevents high initial currents on switching on the device, results in suppression of noise voltages, minimizes power losses and can be connected to a wide variety of control circuits without special interfaces.

7 Claims, 7 Drawing Figures

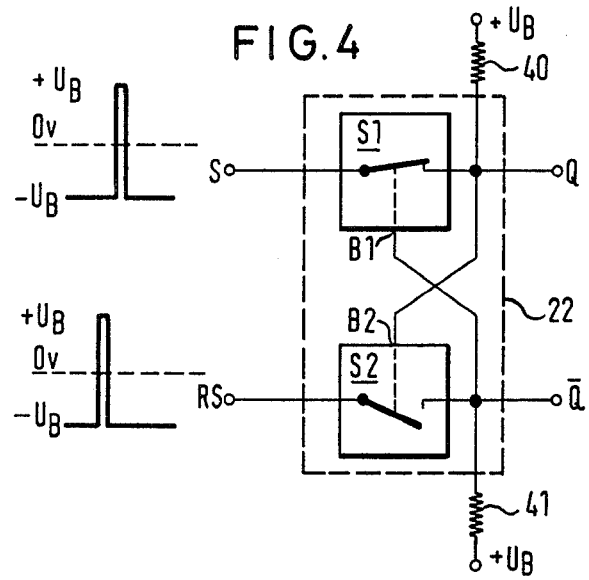
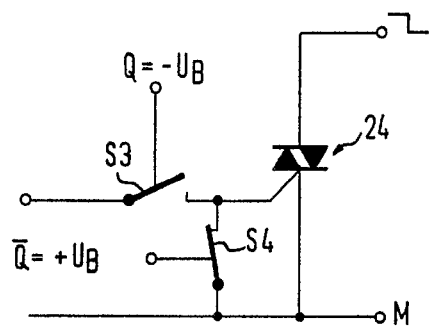
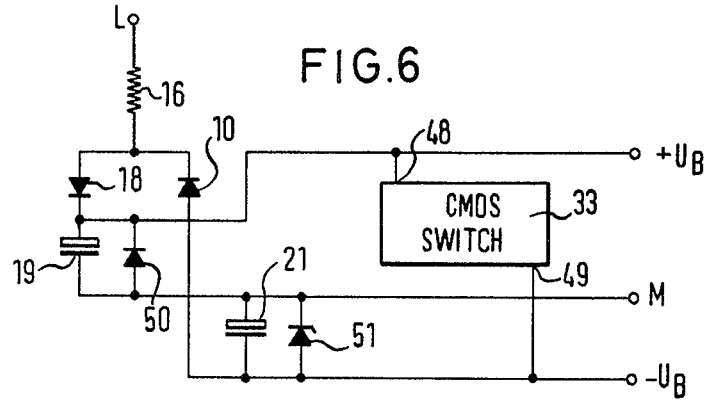

PULSED LIGHT BARRIER APPARATUS FOR DIRECT CONNECTION TO AN A.C. SUPPLY

The invention relates to pulsed light barrier apparatus for direct connection to an a.c. supply and has particular reference to apparatus comprising a photoreceiver, a photodiode transmitter connectable to the a.c. supply via a rectifier diode and a PUT, and a storage capacitor connected in parallel with the PUT and the photodiode, with the storage capacitor being discharged in rhythm with the a.c. supply voltage via the photodiode.

The abbreviation PUT is the conventional abbreviation for a programmable unijunction transistor. In contrast to the manner of operation of the similar thyristor, which switches when the gate terminal is more positive than the cathode, a PUT switches when the gate terminal is more negative than the anode.

Pulsed light barrier apparatus of the above described kind is known per se.

The principal object of the present invention is to keep the degree of complexity of the technical circuitry required for pulsed light barrier apparatus of this kind as low as possible.

It is a further object of the present invention to suppress high initial currents on switching on the apparatus, when appropriate loads are present at the output of the circuit.

Furthermore, the measures required to suppress interference should be kept to a minimum.

In order to satisfy these objects there is provided, in accordance with the invention, apparatus of the above named kind which is characterised in that a Zener diode is connected in parallel with the storage capacitor, in that the gate terminal of the PUT is connected to the terminal (anode) of the rectifier diode which is connected to the a.c. supply voltage, in that the a.c. supply voltage is supplied via a resistor, and in that a capacitor is connected in parallel with the rectifier diode, with the circuit formed by the capacitor and the resistor having a time constant such that a voltage which just begins to fall below the constant voltage value of the Zener diode is present at the control electrode during the zero passage of the a.c. supply voltage.

Thus, in accordance with the invention, a pulsed light source is activated synchronously with the a.c. supply at each zero passage of the a.c. supply voltage. Providing the light path between the photodiode transmitter and the photoreceiver is not interrupted by an obstacle this necessarily leads to the circuit output being switched on during the zero passage of the a.c. supply voltage.

It should be noted that the invention relates to light barrier apparatus of the type in which the light transmitter and light receiver are arranged in a common housing. With an arrangement of this kind a retroreflector is positioned at the end of the region monitored by the light barrier to reflect the light beam radiated by the light transmitter back on itself to the light receiver which is located in the same housing.

The arrangement of the invention has the advantage that high initial currents are suppressed when switching on the apparatus particularly when loads are present which would normally cause such high initial currents. Furthermore, noise voltages are suppressed because at the moment of switching on the apparatus only very low operating voltages need to be processed which leads to a low rate of change of the voltage d U/dt due to the sudden presence of a load at the circuit output. This considerably simplifies the measures necessary to suppress interference in the circuit arrangement of the invention.

In order to provide, in simple manner, a positive operating voltage for the circuit elements present in the light barrier apparatus of the invention there is provided, in accordance with a preferred embodiment, an arrangement in which a first smoothing capacitor is connected via a second rectifier diode, poled in the same direction as the first rectifier diode, between earth and the parallel circuit of the storage capacitor and the Zener diode.

A corresponding negative DC operating voltage for the circuit elements can be generated by connecting a second smoothing capacitor via a third rectifier diode, poled in the opposite direction to the first rectifier diode, between earth and the parallel circuit of the storage capacitor and the Zener diode.

As the received signal of the pulse light barrier apparatus of the invention consists solely of pulses which occur, with a free light path, at time intervals of, for example, 20 ms, a storage element is provided for generating a stationary output signal. This storage element is conveniently realised by a photoreceiver arrangement having a bistable flip-flop stage which is reset on the release of a pulse of light at the photodiode transmitter and set after the appearance of a trivially delayed received pulse at the photoreceiver. The storage element of the invention should store the information as to whether the monitored region of the light barrier is free or not for the time between each succeeding pair of zero passages of the a.c. supply voltage.

The semiconductor switch at the output of the pulsed light barrier apparatus is realised in accordance with the invention by a triac which is statically controlled over all four quadrants by a bistable RS flip-flop stage. In this connection there is provided, in accordance with the invention, an embodiment in which the photoreceiver arrangement has a semiconductor output in the form of a triac with its H1 electrode being connected to earth and its trigger electrode (gate) being alternately connected to earth and to a trigger voltage by switches controlled in antivalent manner from the bistable flip-flop stage.

This construction has the advantage that the output of the photoreceiver arrangement can be used to switch loads having any desired reactive component without the need for phase compensation. It is ensured that the triac is immediately switched on again even after the triac holding current has fallen short of the required value for a short period of time.

The bistable flip-flop stage is realised using two supernumerary analog switches of an integrated circuit module. The control of the triac is expediently achieved using two CMOS analog switches. In this connection one switch is inserted in series in the control line. The second switch switches the triac trigger electrode to 0 V, i.e. to earth. The switches are controlled in antivalent manner from FF outputs.

This construction ensures optimum utilisation of the power provided for control purposes because no energy is consumed in a leakage resistor. In the cut-off condition the trigger electrode of the triac is connected by low resistance path to earth so that improved protection against unintentional triggering, for example by extraneous sources, is achieved.

The operation of the CMOS analog switch takes place with a symmetrical feed voltage. In this way the switches operate bi-directionally whereby the triac can be controlled over all four quadrants.

The invention will now be described in further detail by way of example only and with reference to the drawings which show:

FIG. 1 a schematic circuit diagram of a pulsed light barrier apparatus in accordance with the invention, FIG. 2 the state of a CMOS switch incorporated in the apparatus of FIG. 1 when the region monitored by the apparatus is not obstructed, FIG. 3 the condition of the CMOS switch of FIG. 2 when the region monitored by the light barrier apparatus is obstructed, FIG. 4 a schematic illustration of a bistable flip-flop stage used in the circuit of FIG. 1, FIG. 5 a schematic circuit diagram of a triac control circuit as used in the apparatus of FIG. 1, FIG. 6 a schematic illustration of the power supply used for the circuit arrangement of FIG. 1, and FIG. 7 a pulse diagram taken at various components of the pulse light barrier apparatus of the invention.

As seen in FIG. 1 the pulsed light barrier apparatus of the invention is connected via the terminals L and M to an a.c. supply voltage of for example 220 V and 50 Hz. The a.c. supply voltage terminal M is connected directly to earth.

The a.c. supply voltage terminal L is connected to a diode 12 via an ohmic resistor 16. A capacitor 17 is connected in parallel with the diode 12. A PUT 13 is connected in series with the diode 12 and is followed by a photodiode 11 and an inductor 25. A storage capacitor 14 and a Zener diode 15 are connected in parallel with the series circuit of the PUT 13, the photodiode 11 and the inductor 25. Two further diodes 18, 20 connected antiparallel to one another are connected to the common connection point of the Zener diode 15, the capacitor 14 and the inductor 25. The diode 18 is connected to earth via a first smoothing capacitor 19 and the diode 20 is connected to earth via a second smoothing capacitor 21.

The previously described circuit arrangement forms a pulsed light source which also enables the creation of a positive and a negative operating voltage for the circuit of the photoreceiver arrangement which will now be described.

The photoreceiver arrangement consists of a phototransistor 23 which receives light pulses from the photodiode 11 via a monitored region 26 indicated by a broken line, provided no obstacle is present in the monitored region 26.

The base of the phototransistor 23 is earthed via an ohmic resistor 27 whereas the emitter is connected via an ohmic resistor 28 to the smoothing capacitor 21 and thus to the negative operating voltage. The collector of the phototransistor 23 is connected via a resistor 29 to the smoothing capacitor 19 and thus to the positive operating voltage.

Furthermore, the collector of the phototransistor 23 is connected via a coupling capacitor 30 to the base of an amplifying transistor 31 the base of which is connected via an ohmic resistor 32 to a switch connection of a switch S2 and to the control input of a switch S1 of a CMOS-switch 33. In addition the base of the transistor 31 is connected via a resistor 34 with the positive operating voltage. The positive operating voltage is also applied to the collector of the transistor 31 via a resistor 35. The collector is additionally connected with the switch terminal of the switch S1 inside the CMOS switch 33.

From the connection point between the PUT 13 and the photodiode 11 a line passes via a coupling capacitor 36 and the diode 37 to a switch terminal of the second switch S2 of the CMOS switch 33. The two electrodes of the diode 37 are connected via resistors 38, 39 to the negative operating voltage, i.e. to the smoothing capacitor 21.

Resistors 40, 41 connect the positive operating voltage with two switch terminals of the switches S1, S2 of the CMOS switch 33. The resistor 40 is also connected to the control inputs of the switches S2, S3.

One switch terminal of the switch S3 is connected via an indicator diode 42, a rectifier diode 43 connected antiparallel thereto, a capacitor 44 and a resistor 45 directly to the a.c. supply voltage terminal L. The connection point between the capacitor 44 and the indicator diode 42 is connected via diodes 46 and 47 which are poled in opposite directions to the smoothing capacitor 19 and the smoothing capacitor 21 respectively.

The power supply terminals 48, 49 of the CMOS switch 33 are connected to the positive and negative operating voltages respectively. The positive and negative operating voltages are stabilised by Zener diodes 50 and 51.

The semiconductor output stage of the circuit arrangement of FIG. 1 is formed by a triac 24 the H1 electrode of which is connected to earth and forms one connection terminal of the circuit. The H2 electrode forms the output terminal of the circuit. An RC member formed by a capacitor 52 and a resistor 53 is connected across the two triac electrodes H1, H2. The load which is to be switched by the circuit is connected between the output terminal H2 of the triac and L.

The trigger electrode 24' of the triac 24 is connected to the one switch terminal of the switch S4 and to the switch terminal of the switch S3 of the CMOS switch 33.

The manner of operation of the described circuit arrangement is as follows:

During the positive half wave of the a.c. supply voltage the capacitor 14 is charged via the resistor 16 and the diode 12. As soon as the voltage at the capacitor 14 has exceeded the Zener voltage at the Zener diode 15 the Zener diode 15 restricts the charge voltage to a value which remains constant. The charging process is terminated at this point in time. As, however, the a.c. supply voltage continues to rise the current now flows via the Zener diode 15 and the rectifier diode 18 to the smoothing capacitor 19 where the excess energy is used to form the positive operating voltage for the circuit.

As soon as the a.c. supply voltage has exceeded its peak value it begins to fall away again. For the transmitter this signifies that the voltage at the control electrode 13' of the PUT 13 reduces although the voltage at the storage capacitor 14 and thus at the anode of the PUT 13 remains constant. The resistance 16 together with the capacitor 17 however limits the voltage at the gate terminal 13' of the PUT 13.

The time constant of the circuit formed by the resistor 16 and the capacitor 17 thus ensures that the voltage at the gate terminal 13' of the PUT 13 reduces in delayed manner relative to the a.c. supply voltage. By suitably dimensioning the resistor 16 and the capacitor 17 this time delay is selected, in accordance with the invention, so that a voltage which just begins to fall below the constant voltage value of the Zener diode 15 is present at the gate terminal 13' of the PUT during the zero passage of the a.c. supply voltage. This satisfies the trigger condition for the PUT 13. The PUT 13 now triggers at the zero passage of the a.c. supply voltage and the charge of the storage capacitor 14 is short circuited via the PUT 13, the photodiode 11 and the inductor 25. The resulting pulse of current is converted in the photodiode 11 to a light pulse. It is noteworthy that this light pulse is transmitted during the zero passage of the a.c. supply voltage. This temporal association between the transmitted light pulse and the phase of the a.c. supply voltage is of decisive significance for the overall function of the pulsed light barrier of the invention.

The discharge of the storage capacitor 14 results in the current through the PUT 13 falling sufficiently far below the holding current that the PUT cuts-off thus terminating the transmission procedure. During the following negative half wave no flash of light is transmitted. The a.c. supply voltage is however used during this phase to produce a flow of current to the smoothing capacitor 21 via the resistor 16, the gate/anode path of the PUT 13, the Zener diode 15 and the rectifier diode 20 so that a negative operating voltage for the receiver circuit is formed at this smoothing capacitor 21. The light pulse transmitted by the photodiode 11 is received by the phototransistor 23 providing the light path between the sender and receiver is free. The phototransistor 23 converts the flash of light into a current pulse which produces a negative voltage jump at the working resistor 29. This voltage jump is passed via the coupling capacitor 30 to the base of the amplifying transistor 31. The transistor 31 which conducts in the passive condition is now switched off for a short period by this control voltage so that the voltage at the collector of the transistor makes a positive jump. This voltage jump at the collector of the transistor 31, or at the resistor 35, represents the actual reception signal. The reception pulse appears, as a result of the transit times of the receiving circuit, at a time which is significantly later than the transmitted pulse and this is of particular significance for the functioning of the circuit arrangement.

The reception signal thus consists solely of pulses which occur at time intervals of 20 ms when the light path is free.

In order to obtain a stationary output signal use is made of a storage element in the form of a bistable flip-flop stage of the RS flip-flop type.

In accordance with the invention the bistable flip-flop 22 forms a component of the CMOS switch 33. The CMOS switch contains four analog switches of which, as stated, two are used to construct the bistable flip-flop stage 22.

The function of the bistable flip-flop stage will now be explained with reference to FIGS. 1 and 4. FIG. 4 represents the bistable flip-flop stage in the reset condition. The signal logic 1 is present at the output $\overline{Q}$ and the value logic 0 at the output Q because the "pull-up" resistor 40 is connected to earth via the switch S1. At the same time this value logic 0 is connected to the control input B2 of the switch S2. This holds the switch S2 open so that as stated $\overline{Q}$ represents the value logic 1 and B1 simultaneously holds the switch S1 closed. The bistable flip-flop stage 22 is thus in one of the two stable conditions.

If the bistable flip-flop stage now receives a positive voltage pulse at the set input S, as indicated at the left hand side of FIG. 4 the value 1 appears at the output Q because the switch S1 is still closed. As soon as the value logic 1 appears at the output Q the control input B2 of the switch S2 is also at the value logic 1. This has the consequence that the switch S2 closes. The bistable flip-flop stage now switches into its second stable condition. The closed switch S2 connects the earth potential from the reset input RS to the output $\overline{Q}$. The output $\overline{Q}$ and thus the control input B1 of the switch S1 change to the value logic 0. The switch S1 opens and the output Q has the value logic 1 via the resistor 40. The bistable flip-flop stage is now once again in a stable condition.

When the transmitter generates a flash of light via the photodiode 11 a positive voltage jump occurs at the anode of the photodiode 11. This positive voltage jump reaches the working resistor 38 via the capacitor 36 and is then applied via the diode 37 to the reset input RS of the bistable flip-flop stage 22. The bistable flip-flop stage 22 is now directly reset by the transmitter on the occurrence of each flash of light. The resistor 39 holds the reset input at its reference potential of the negative feed voltage during the spaces between pulses.

The bistable flip-flop stage 22 is set by the receiver. For this purpose the collector of the transistor 31 is connected with the set input of the flip-flop. A setting pulse therefore always appears when the receiver has seen the transmitted pulse, i.e. when the light path between the transmitter and receiver is free. When the light path between the transmitter and the receiver is free the transmitter resets the bistable flip-flop stage 22 during the zero passage of the a.c. supply voltage. The delayed appearance of the received pulse or setting pulse once again sets the flip-flop stage and it remains set over the whole period of the a.c. supply voltage. The flip-flop stage is only reset for a short period during the zero passage of the a.c. supply voltage and is then immediately set again by the receiver.

When the light path is interrupted by an obstacle the next transmitted pulse results in resetting of the bistable flip-flop stage 22. Although the bistable flip-flop stage is now already reset it nevertheless receives renewed reset commands on the occurrence of each new transmitted pulse (zero passage). The bistable flip-flop stage thus remains stable in the reset condition as long as no reception signal reaches the receiver.

A change in the condition of the bistable flip-flop stage is thus fundamentally only possible during the zero passage of the a.c. supply voltage. If a change of state occurs in the region monitored by the light barrier during two zero passages of the a.c. supply voltage this change of state cannot initially be registered but instead only at the next zero passage.

The important component of the semiconductor output stage of the invention is the triac 24. The special triac control which has the largest possible efficiency is of considerable significance for the functioning of the pulsed light barrier of the invention.

In accordance with the invention the control of the triac takes place by an a.c. voltage at the gate 24'. An a.c. voltage switch is thus required the switching current of which can however be decisively lower than that of the circuit output. Fundamentally one can consider rectifiers in conjunction with thyristors or the like (relays). These are substitute solutions for the total circuit output (without triac). The preferred arrangement is that shown in the embodiment using the further analog switches S3, S4 contained in the CMOS switch 33. S3/S4 represent the above named a.c. voltage switches.

The control of the triac 24 is also schematically illustrated in FIG. 5.

The triac 24 can be controlled without losses using two analog switches S3, S4. The two switches are controlled antivalent to Q, $\bar{Q}$ from the previously described flip-flop stage 22. In order once again to operate as far as possible without losses the control current is taken from the a.c. supply L via the capacitor 44 and the resistor 45. The indicator diode 42 likewise lies in the control branch parallel to the rectifier diode 43. The advantages of this arrangement lie in the fact that the use of the capacitor 44 makes voltage division possible without large active losses and in the fact that even the voltage drop at the indicator diode 42, or the rectifier diode 43, is utilised.

As the control for the triac via the diodes 46, 47 is also connected to the two operating voltages it assists the internal operating voltage when the output is inactive.

In the circuit arrangement of the invention attention is paid to minimal power consumption, i.e. to minimal power losses. This is particularly assisted by the internal voltage supply, by the use of an integrated CMOS module and not last by the use of analog switches to form a bistable flip-flop stage and also to control the triac.

FIG. 6 once again shows in simplified and more easily followed form the formation of the positive and negative operating voltage for the photoreceiver arrangement. This simplified circuit diagram shows only those components which are necessary to form the operating voltages.

Figure 1:
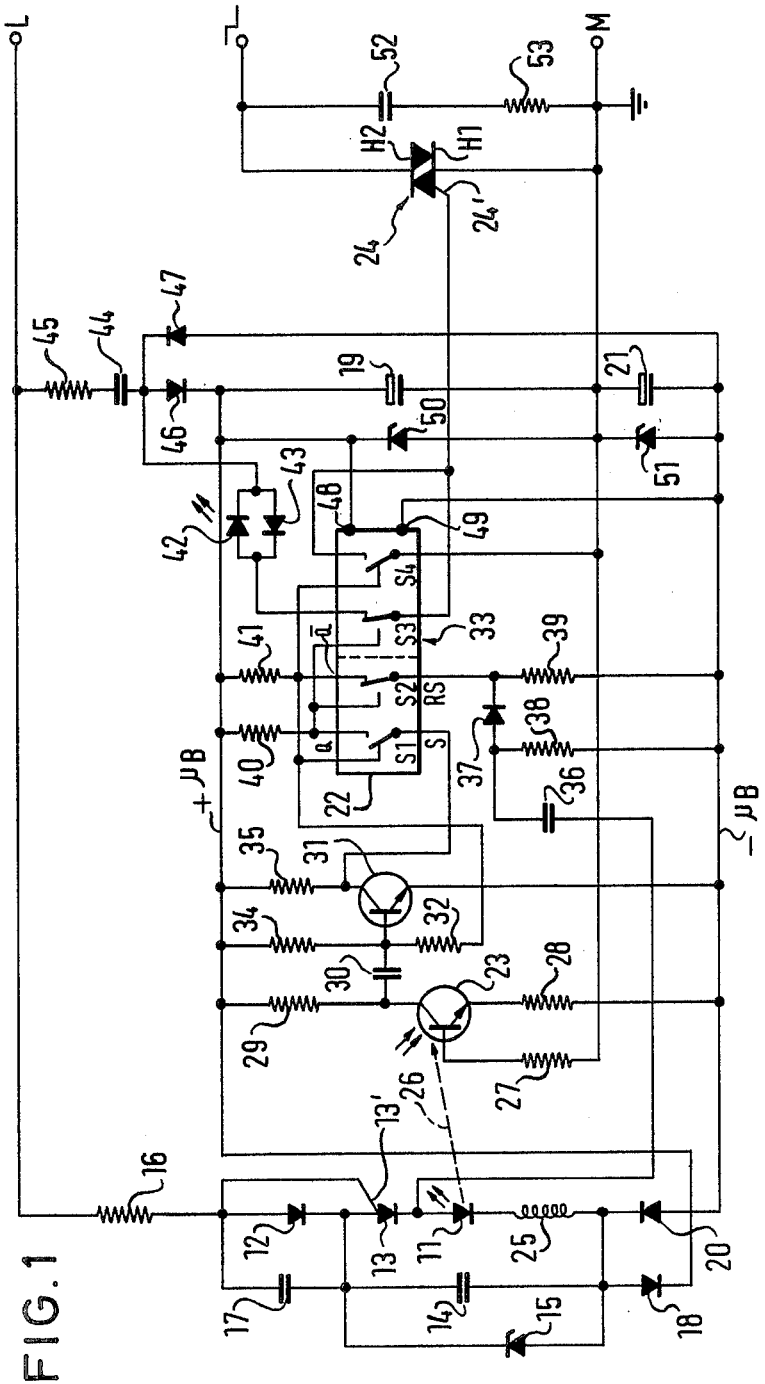
Figure 3:
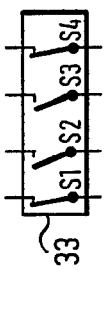
FIGS. 2 and 3 show the switched states of the CMOS switch 33 when the light path is free (FIG. 2) and interrupted (FIG. 3).
Figure 2:
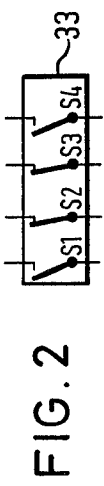
Figure 7:
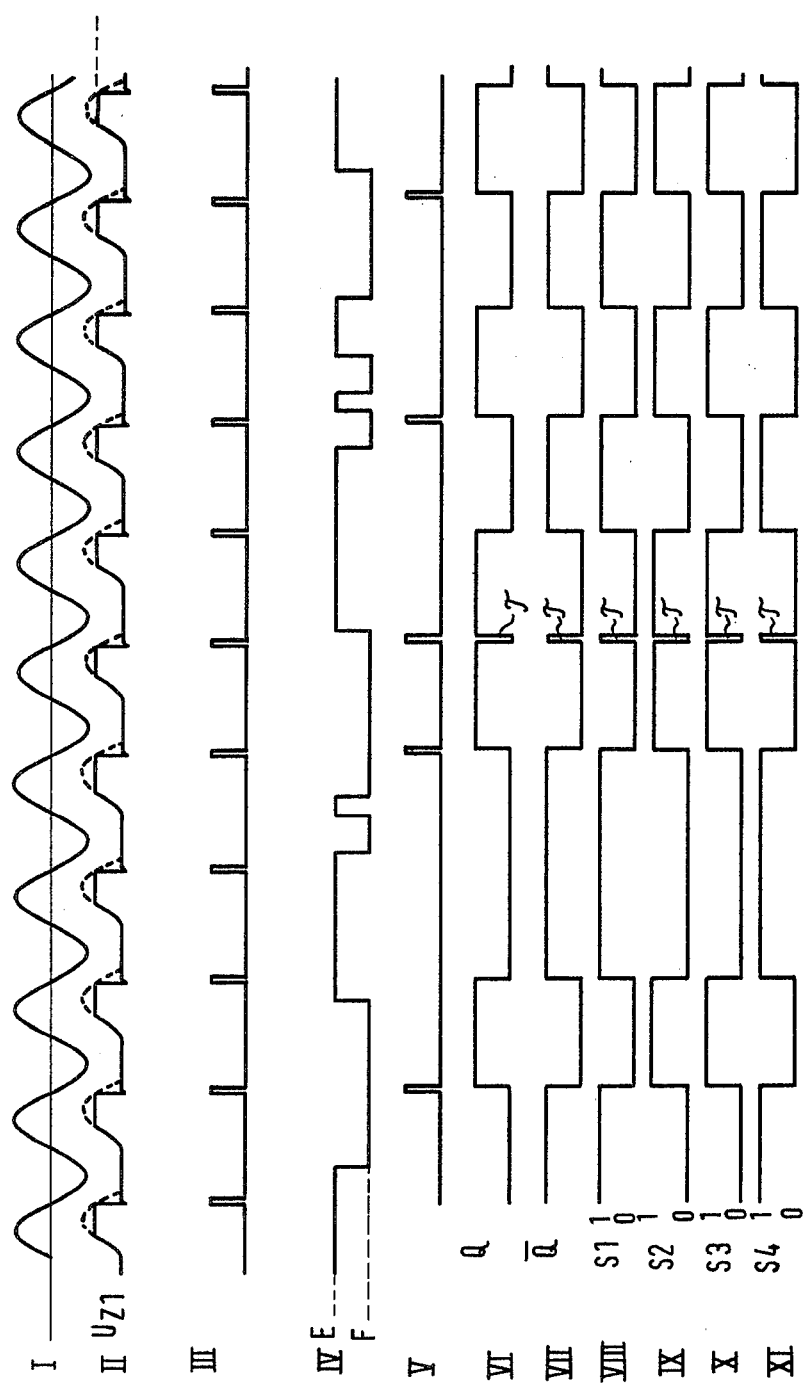
FIG. 7 shows the pulse diagrams of various components of the circuit arrangement of the invention and indeed as follows.

Diagram I shows the a.c. supply voltage, diagram II shows the charge-voltage curve for the storage capacitor 14 from which it can be clearly seen that the discharged condition is reached significantly after the Zener voltage has been attained. The broken curve shows the voltage delayed by the capacitor 17 and the resistor 16 at the control electrode 13' of the PUT 13. If the broken line voltage falls below the value of the voltage $U_{Z1}$ the PUT 13 triggers and a light flash occurs. The broken line voltage curve cannot be shown on an oscillograph because it is likewise limited by the Zener diode 15 via the diode 12. If the PUT 13 were not to trigger then the voltage curve would have the shape shown to the right of the vertical flank (delay). The limitation by the Zener diode 15 and also charge storage by the capacitor 14 is shown after the extreme right hand pulse of diagram II. Thus, after the trigger point of the PUT, the voltage does not have the shape shown in broken lines for the purpose of explanation because the voltage is limited by the Zener diode 15. In diagram II the actual voltage shape at the anode 13 is shown as a solid line.

Diagram III shows the current in the photodiode 11 and thus indicates the appearance of the transmitted light flashes. The abscissa of all the diagrams represent time and indeed to the same scale.

The signal of diagram III simultaneously represents the reset pulse for the bistable flip-flop stage 22. Diagram IV represents a particular rhythm of interruption of the region monitored by the light barrier. The level E signifies interruption of the level whereas the level F corresponds to uninterrupted passage of light through the monitored region 26.

The diagram V reproduces the signal received at the collector of the transistor 31. The significant feature is the appearance of this signal in each case at a very short time after resetting of the bistable flip-flop stage 22. The diagrams VI and VII reproduce the voltage changes at the outputs Q and $\bar{Q}$ of the bistable flip-flop stage 22.

Finally, the diagrams VIII, IX, X and XI reproduce the states of the switches S1, S2, S3 and S4 with one representing the closed and O representing the open state of each switch. The receiver transit time is designated in diagrams VI to XI with $\tau$.

It will be appreciated by those skilled in the art that the presently described circuit can be varied in many ways without departing from the scope of the present teaching. In particular it is pointed out that the circuit can be used to drive a photodiode transmitter consisting of a series of photodiodes instead of just one photodiode as specifically described in the present arrangement.

We claim:

1. Pulsed light barrier apparatus for direct connection to an a.c. supply, said apparatus comprising a photoreceiver, a photodiode transmitter connectable to the a.c. supply via a rectifier diode and a PUT, and a storage capacitor connected in parallel with the PUT and the photodiode transmitter, said storage capacitor being discharged in rhythm with the a.c. supply voltage via the photodiode, the apparatus being characterised in that a Zener diode is connected in parallel to the storage capacitor, in that the gate terminal of the PUT is connected to the terminal of the rectifier diode which is connected to the a.c. supply voltage, in that the a.c. supply voltage is supplied via a resistor, and in that a capacitor is connected in parallel with the rectifier diode, with the circuit formed by the capacitor and the resistor having a time constant such that a voltage which just beings to fall below the constant voltage value of the Zener diode is present at the control electrode during the zero passage of the a.c. supply voltage.

2. Pulsed light barrier apparatus in accordance with claim 1 and characterised in that a first smoothing capacitor (19) is connected via a second rectifier diode (18), poled in the same direction as the first rectifier diode (12), between earth (M) and the parallel circuit of the storage capacitor (14) and the Zener diode (15).

3. Pulsed light barrier apparatus in accordance with claim 1 and characterised in that a second smoothing capacitor (21) is connected via a third rectifier diode (20) poled in the opposite direction to the first rectifier diode (12), between earth (M) and the parallel circuit of the storage capacitor (14) and the Zener diode.

4. Pulsed light barrier apparatus in accordance with one of the preceding claims and including a bistable flip-flop stage which is reset on the release of a pulse of light at the photodiode transmitter and set after the pulse of light is received at the photoreceiver.

5. Pulsed light barrier apparatus in accordance with claim 4 and including a semiconductor output in the form of a triac with its first electrode being connected to earth, its second electrode being connected to the output and its trigger electrode being alternately connected to earth and to a trigger voltage by first and second output switches.

6. Pulsed light barrier apparatus in accordance with claim 5 and characterised in that the bistable flip-flop stage is formed by first and second stage switches which are combined into a unitary CMOS-switch.

7. Pulsed light barrier apparatus in accordance with claim 6 and wherein the positions of said first and second stage switches are always reversed from that of said first and second output switches respectively.

* * * * *